United States Patent Office 3,293,070
Patented Dec. 20, 1966

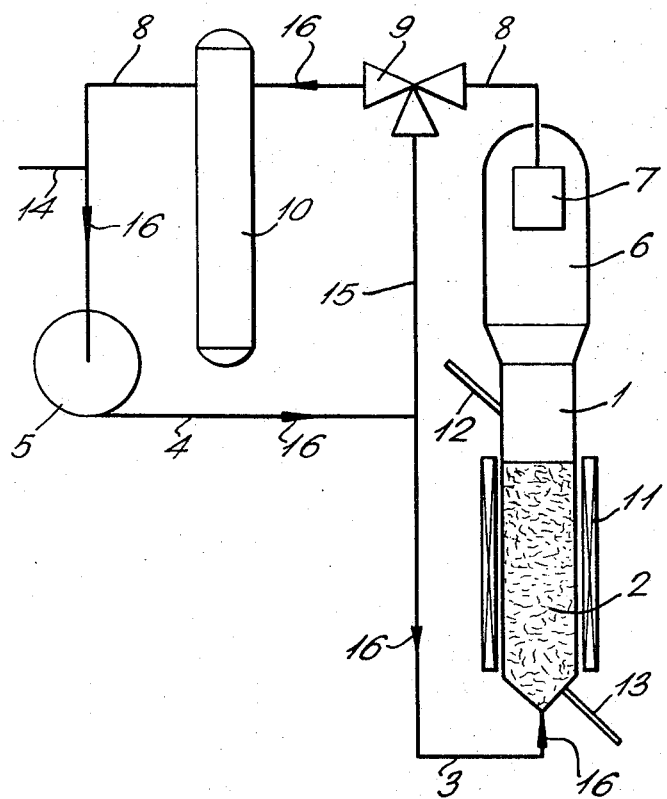

3,293,070
COATING WITH BERYLLIA
James Elgie Lloyd, and Frederick Samuel Martin, Lea, Preston, England, assignors to United Kingdom Atomic Energy Authority, London, England
Filed Apr. 8, 1963, Ser. No. 271,182
Claims priority, application Great Britain, Apr. 19, 1962, 15,223/62
6 Claims. (Cl. 117—100)

This invention relates to ceramic coating, and in particular to coating with beryllia.

According to the invention, a method of coating a body with beryllia includes the step of exposing the body to the vapour produced by heating basic beryllium nitrate.

The mechanism of coating will be dependent on the temperature at which the exposure step is carried out. The vapour produced by heating basic beryllium nitrate may be heated above the decomposition temperature (i.e. to a temperature in the range 350–1400° C.) of the latter before coming into contact with the body to be coated. Decomposition of the basic beryllium nitrate will then take place in the vapour phase and the solid product beryllia will be deposited on the body. Alternatively, where the body to be coated is capable of adsorbing basic beryllium nitrate on its surface, the body may be maintained at a temperature at or above the said decomposition temperature (i.e. at a temperature in the range 350–1400° C.) and the vapour may be maintained at a temperature below said decomposition temperature (i.e. at a temperature below 300° C.). Basic beryllium nitrate is then adsorbed on the surface of the body, followed by rapid decomposition of the adsorbed layer to beryllia, on which further layers of beryllia may be built up by successive surface adsorptions and rapid decompositions of further amounts of basic beryllium nitrate until a coating of a desired thickness has been produced.

The invention is particularly but not exclusively applicable to the production of fuel for nuclear reactors. Uranium dioxide particles may be coated with beryllia in a manner according to the invention and the coated particles may then be dispersed in a matrix of beryllia which is suitably shaped to provide a fission product retaining fuel element for a nuclear reactor.

Addison and Walker have reported the preparation of basic beryllium nitrate in Proceedings of the Chemical Society, July 1961, page 242, by the following route. Solvolysis of beryllium chloride in ethyl acetate-dinitrogen tetroxide mixtures produces the addition compound $Be(NO_3)_2 \cdot 2N_2O_4$ in crystalline form. When heated in vacuo, these crystals decompose in two stages, firstly by production of anhydrous beryllium nitrate in powder form with evolution of $N_2O_4$ above 50° C., and secondly sudden decomposition of the anhydrous beryllium nitrate (which has no detectable volatility) above about 125° C. to give $N_2O_4$ and volatile basic beryllium nitrate $Be_4O(NO_3)_6$ which separates as colourless crystals from the gas phase.

The method of the invention will now be described by way of example with reference to the accompanying drawing the single figure of which is a semischematic elevation of a fluidised bed.

In the drawing there is shown a fluidised bed 1 containing a bed of spherical particles of uranium dioxide 2. The uranium dioxide particles 2 are coated with beryllia by being fluidised in the bed by a carrier gas containing a proportion of the vapour of basic beryllium nitrate $Be_4O(NO_3)_6$ (produced by volatilisation of basic beryllium nitrate crystals or during the preparation of basic beryllium nitrate from anhydrous beryllium nitrate. A carrier gas such as argon is used which is inert to the vapour and also to uranium dioxide, beryllia and the gaseous decomposition products of basic beryllium nitrate.

To fluidise the uranium dioxide particles 2 in the bed 1 the mixture of carrier gas and the vapour of basic beryllium nitrate is passed into the lower end of the bed 1 through a line 3 leading from the outlet line 4 of a compressor 5. Above the level of the uranium dioxide particles 2 in the bed 1 there is a disentrainment section 6 of enlarged diameter containing a solids filter 7. The gases leave the fluidised bed 1 through the filter 7 and an outlet line 8 which leads via a three-way valve 9 and a heat exchanger 10 to the inlet of the compressor 5. The lower end of the bed 1 containing the uranium dioxide particles 2 is heated by an external muff heater 11. An inlet branch 12 provides for the introduction of uranium dioxide particles into the bed 1 and beryllia coated uranium dioxide particles are removed from the bed 1 via an outlet branch 13 leading from the lower end of the bed 1. An inlet branch 14 for the introduction of fresh basic beryllium nitrate vapour into the system is provided in the line 8 between the heat exchanger 10 and the compressor 5. A blow back line 15 for clearing the filter 7 of accumulated solids is provided leading from the outlet line 4 of the compressor 5 to the three-way valve 9.

The movement of gas during fluidisation is as shown by the solid headed arrows 16 in the drawing. The uranium dioxide particles 2 are maintained by the muff heater 11 at a temperature above the decomposition temperature of basic beryllium nitrate (i.e. at a temperature in the range 350–1400° C. for example 1000° C.) and the temperature of the mixed vapour and carrier gas entering the fluidised bed 1 through the inlet line 3 is kept below the decomposition temperature of basic beryllium nitrate (i.e. at a temperature below 300° C. for example 200° C.).

The gases leaving the fluidised bed 1 through the outlet line 8 are at a high temperature and are depleted in basic beryllium nitrate vapour content. Prior to replenishing the basic beryllium nitrate vapour content of the gases, by introduction of fresh beryllium nitrate into the system through the inlet branch 14, the gases in passing through the heat exchanger 10 are cooled to a temperature below the decomposition temperature of the basic beryllium nitrate vapour. The degree of cooling of the gases by the heat exchanger 10 is arranged so that the mixture of vapour and carrier gas is fed into the fluidised bed 1 at the correct temperature.

Coating of the uranium dioxide particles with beryllia in the fluidised bed 1 takes place by the surface adsorption mechanism hereinbefore described.

In an alternative method the mixture of gases is passed into the fluidised bed at a temperature above the decomposition temperature of basic beryllium nitrate vapour; (i.e. at a temperature in the range 350–1400° C. e.g. 1000° C.). At this temperature the basic beryllium nitrate vapour introduced into the system through the inlet branch 14 will be decomposed in the vapour phase before entering the fluidised bed 1 and the solid product beryllia will be directly deposited on the uranium dioxide particles 2 in the fluidised bed 1.

The invention may also be applied to the treatment of any body on which it is desired to deposit a refractory beryllia coating or lining, for example crucibles for high temperature melting. As beryllium compounds are highly toxic, it is necessary to take precautions to avoid injury to personal health. Such precautions have been well publicised.

We claim:
1. A method of coating a body with beryllia including the step of exposing the body to the vapour produced by heating basic beryllium nitrate, and employing thermal decomposition for producing the beryllia from said vapor.
2. A method of coating a body with beryllia as claimed in claim 1 wherein the vapour is heated above the tem- perature at which it is decomposed to beryllia before coming into contact with the body to be coated.

3. A method of coating a body with beryllia as claimed in claim 1 wherein the body is maintained at a temperature above the temperature at which the vapour decomposes to beryllia, the vapour before coming into contact with the body being maintained at a temperature below the decomposition temperature of the vapour whereby the vapour adsorbed on the body is heated by contact with the body to a temperature above the decomposition temperature of the vapour so that the vapour adsorbed by the body is decomposed to beryllia on which further beryllia is deposited by successive surface adsorption and decomposition of further amounts of basic beryllium nitrate vapour until a desired thickness of coating of beryllia on the body is produced.

4. A method of coating a body with beryllia as claimed in claim 2 wherein the vapour before coming into contact with the body to be coated is heated to a temperature in the range 350–1400° C.

5. A method of coating a body with beryllia as claimed in claim 3 wherein the body to be coated is maintained at a temperature in the range 350–1400° C. and the vapour before coming into contact with the body is maintained at a temperature below 300° C.

6. A method of coating with beryllia as claimed in claim 1 applied to the coating of particulate material wherein the particulate material is fluidised in a fluidised bed by means of an inert fluidisation gas contaning vaporized basic beryllium nitrate.

References Cited by the Examiner

UNITED STATES PATENTS 3,067,048   12/1962   Grim _____ 106—55 X

RALPH S. KENDALL, *Primary Examiner.*

RICHARD D. NEVIUS, *Examiner.*

A. GOLIAN, *Assistant Examiner.*